(12) United States Patent
Tonooka

(10) Patent No.: US 7,206,128 B2
(45) Date of Patent: Apr. 17, 2007

(54) ILLUMINATION UNIT OF STEREOMICROSCOPE

(75) Inventor: Masahito Tonooka, Hino (JP)

(73) Assignee: Olympus Corporation, Tokyo (JP)

( * ) Notice: Subject to any disclaimer, the term of this patent is extended or adjusted under 35 U.S.C. 154(b) by 170 days.

(21) Appl. No.: 10/858,895

(22) Filed: Jun. 2, 2004

(65) Prior Publication Data

US 2004/0246575 A1    Dec. 9, 2004

(30) Foreign Application Priority Data

Jun. 3, 2003    (JP)    ............................. 2003-158363

(51) Int. Cl.
*G02B 21/06* (2006.01)

(52) U.S. Cl. ...................... 359/388; 359/385; 359/390

(58) Field of Classification Search ................ 359/368, 359/372, 376, 385, 388, 390
See application file for complete search history.

(56) References Cited

U.S. PATENT DOCUMENTS 4,148,552 A * 4/1979 Suzuki et al. ............... 359/388
6,204,963 B1 * 3/2001 Grafenhain et al. ......... 359/384

FOREIGN PATENT DOCUMENTS

JP    63-10408    3/1988
JP    2527158    11/1996

* cited by examiner

*Primary Examiner*—Drew A. Dunn
*Assistant Examiner*—Joshua L. Pritchett
(74) *Attorney, Agent, or Firm*—Scully, Scott, Murphy & Presser PC

(57) ABSTRACT

In an illumination switching frame fixed to the end of an objective of Greenough stereomicroscope, a folding mirror is fixed removably to illumination optical axes q and q' to switch coaxial vertical illumination and episcopic illumination.

34 Claims, 8 Drawing Sheets

ILLUMINATION UNIT OF STEREOMICROSCOPE

CROSS-REFERENCE TO RELATED APPLICATIONS

This application is based upon and claims the benefit of priority from prior Japanese Patent Application No. 2003-158363, filed Jun. 3, 2003, the entire contents of which are incorporated herein by reference.

BACKGROUND OF THE INVENTION

1. Field of the Invention

The present invention relates to an illumination unit of a stereomicroscope, which is attached to the end of an objective of a stereomicroscope to enable coaxial vertical illumination and episcopic illumination.

2. Description of the Related Art

As a method of reflected light illumination of a stereomicroscope, episcopic illumination and coaxial vertical illumination are generally used. In episcopic illumination method, illumination light is illuminated episcopicly to a sample. To realize a episcopic illumination method, irradiate a sample by using a lamp or fiber from the outside of the observation optical axis of a stereomicroscope. The outside of the observation optical axis of a stereomicroscope is for example the side of a stereomicroscope or the inside of a stand for holding and focusing a stereomicroscope.

A coaxial vertical illumination method is used for obtaining an observation image of a sample clear to the depths without a shadow, or for obtaining an observation image free from insufficient intensity in incident light to an observation optics when observing a highly reflective sample. In a coaxial vertical illumination method for obtaining these observation images, the observation optical axis and illumination optical axis of a stereomicroscope are aligned.

A coaxial vertical illumination unit is necessary for realizing coaxial vertical illumination in a stereomicroscope. The technology of a coaxial vertical illumination unit is described in Jpn. UM Appln. KOKAI Publication No. 2527158 and Jpn. Patent Appln. KOKAI Publication No. 63-10408, for example. The Jpn. UM Appln. KOKAI Publication No. 2527158 describes that a semi-transparent mirror is provided in a microscope to make the microscope exclusive for coaxial vertical illumination to be realized. The Jpn. Patent Appln. KOKAI Publication No. 63-10408 describes that coaxial vertical illumination is realized by providing a coaxial vertical illumination unit removably at the end of an objective.

BRIEF SUMMARY OF THE INVENTION

According to an aspect of the invention, there is provided an illumination unit of a stereomicroscope having a pair of observation optical axes aligned at a position of a sample with an inward angle, and a pair of objectives arranged on the observation axes, comprising a pair of illumination light sources which outputs illumination light; a pair of illumination optical axes which is provided with an angle to the observation optical axes, and on which the illumination light outputted from the illumination light sources travels; a pair of illumination lenses which condenses the illumination light traveled on the illumination optical axes; and a reflecting optics which reflects the illumination light condensed by the illumination lenses more than one time, and reflects the illumination light coaxially downward to the observation optical axes.

According to another aspect of the invention, there is provided an illumination unit of a stereo-microscope having a pair of observation optical axes aligned at a position of a sample with an inward angle, and a pair of objectives arranged on the observation axes, comprising a pair of illumination light sources which outputs illumination light; a pair of illumination optical axes which is provided with an angle against the observation optical axes passing near a sample including the sample, and on which the illumination light outputted from the illumination light sources travels; a pair of illumination lenses which condenses the illumination light traveled on the illumination optical axes; a mirror which is removably inserted onto the illumination optical axes, and reflects the illumination light condensed by the illumination lenses; and a semi-transparent mirror which is provided on the observation optical axes, reflects the illumination light reflected by the mirror coaxially downward to the observation optical axes, and transmits the light from the sample to the objective lenses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Hereinafter, a first embodiment of the present invention will be explained with reference to the accompanied drawings.

Figure 1:
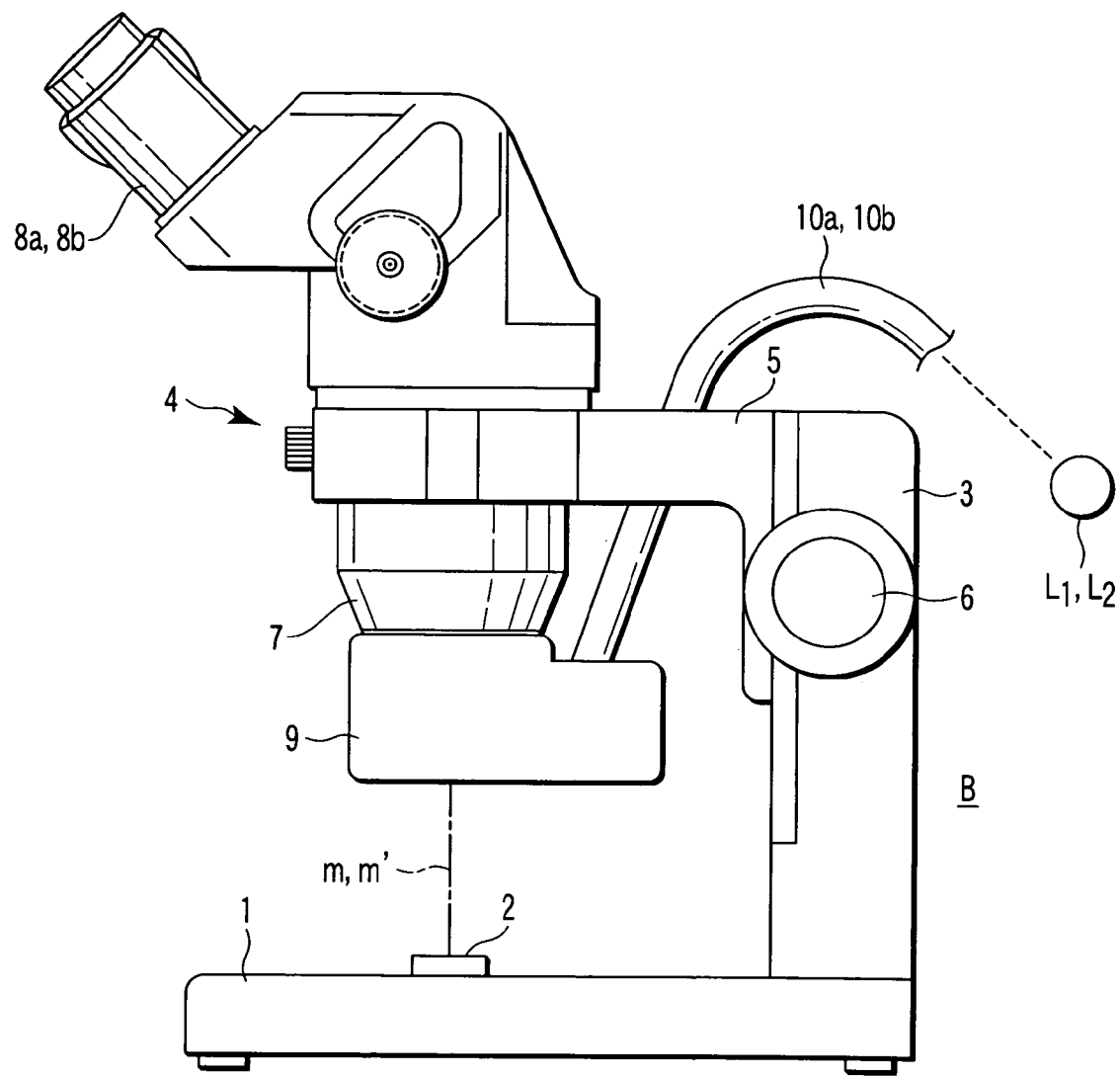
FIG. 1 is an external view of Greenough stereomicroscope according to the present invention.

FIG. 1 is an external view of Greenough stereomicroscope. A sample 2 is placed on a stage 1. A stand 3 is set up on the stage 1. A microscope body 4 is provided on the stand 3 movably up and down through a support arm 5. A focus adjustment handle 6 is provided on the stand 3. The focus adjustment handle 6 is manually operated to move up and down the support arm 5 with respect to the stand 3.

An objective 7 is provided in the lower part of the microscope body 4. Eyepieces 8a and 8b are provided in the upper parts of the microscope body 4. An illumination switching frame 9 or an enclosure is provided at the end of the objective 7. One end of a pair of illumination optical fibers 10a and 10b is connected to the illumination switching frame 9. Light sources L1 and L2 are connected to the other end of the illumination optical fibers 10a and 10b, respectively.

Figure 2:
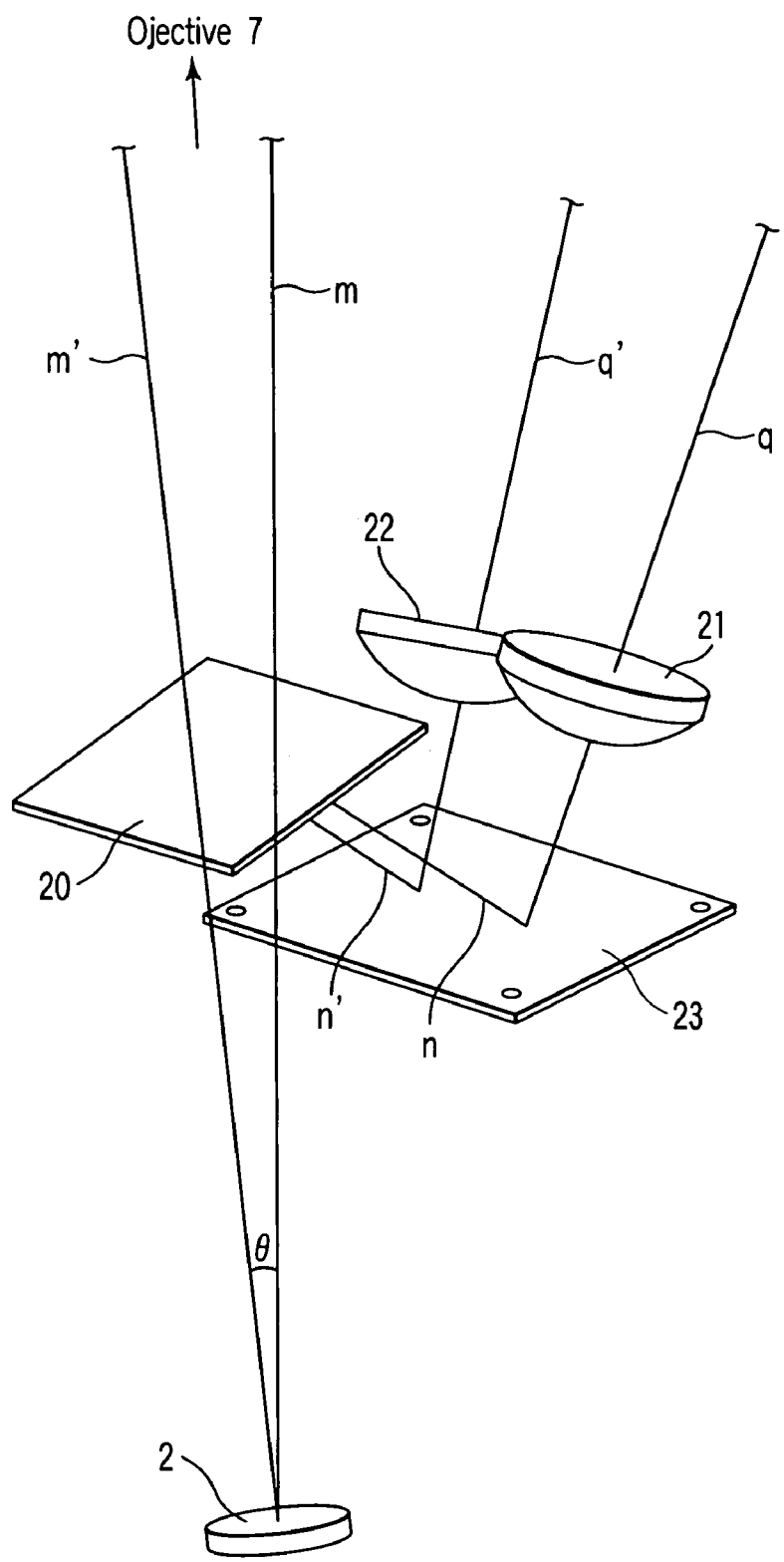
FIG. 2 is a bird's eye view of the optics of the same microscope.
Figure 3:
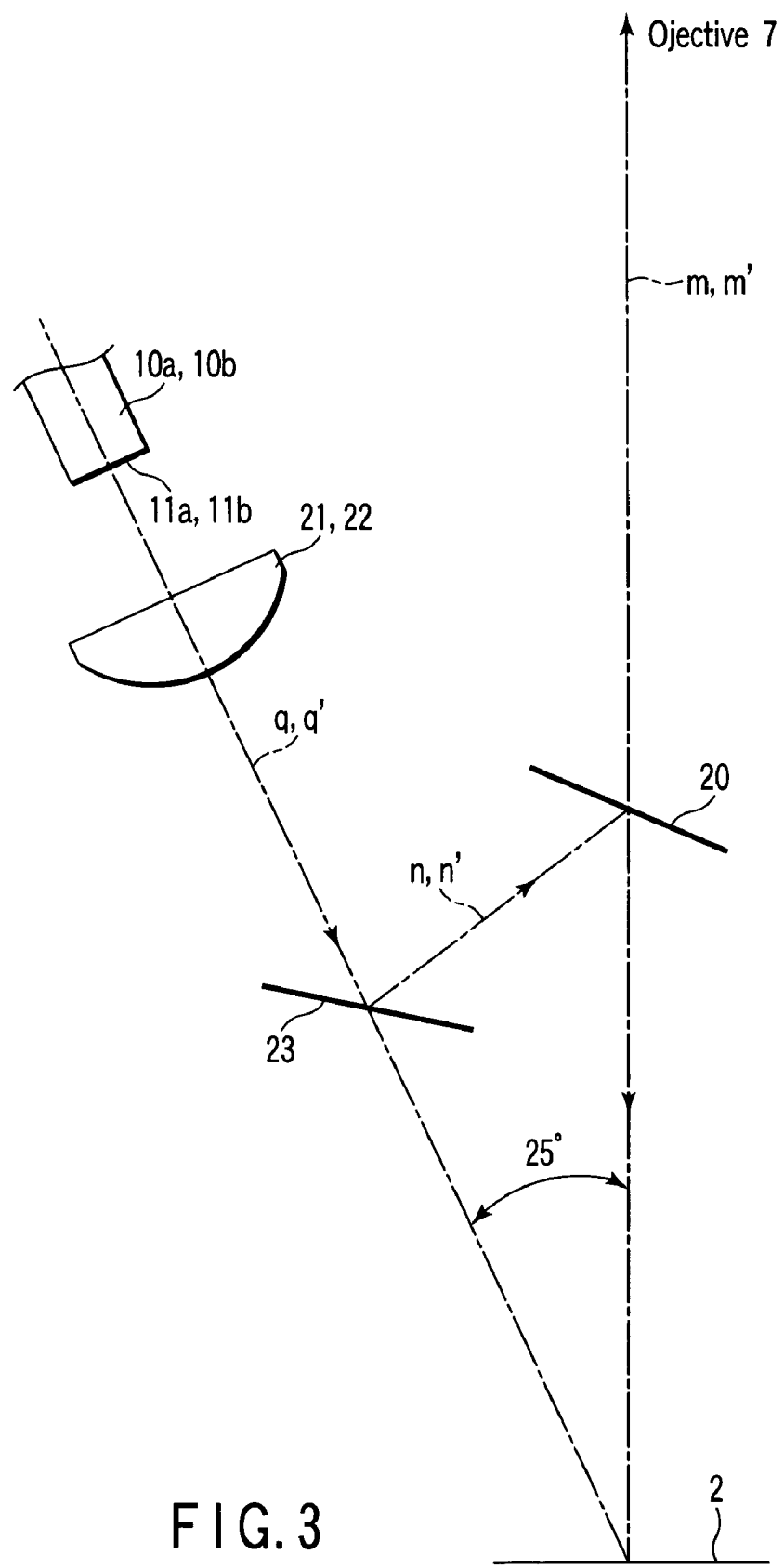
FIG. 3 is a front view of the optics of the same microscope.
Figure 4:
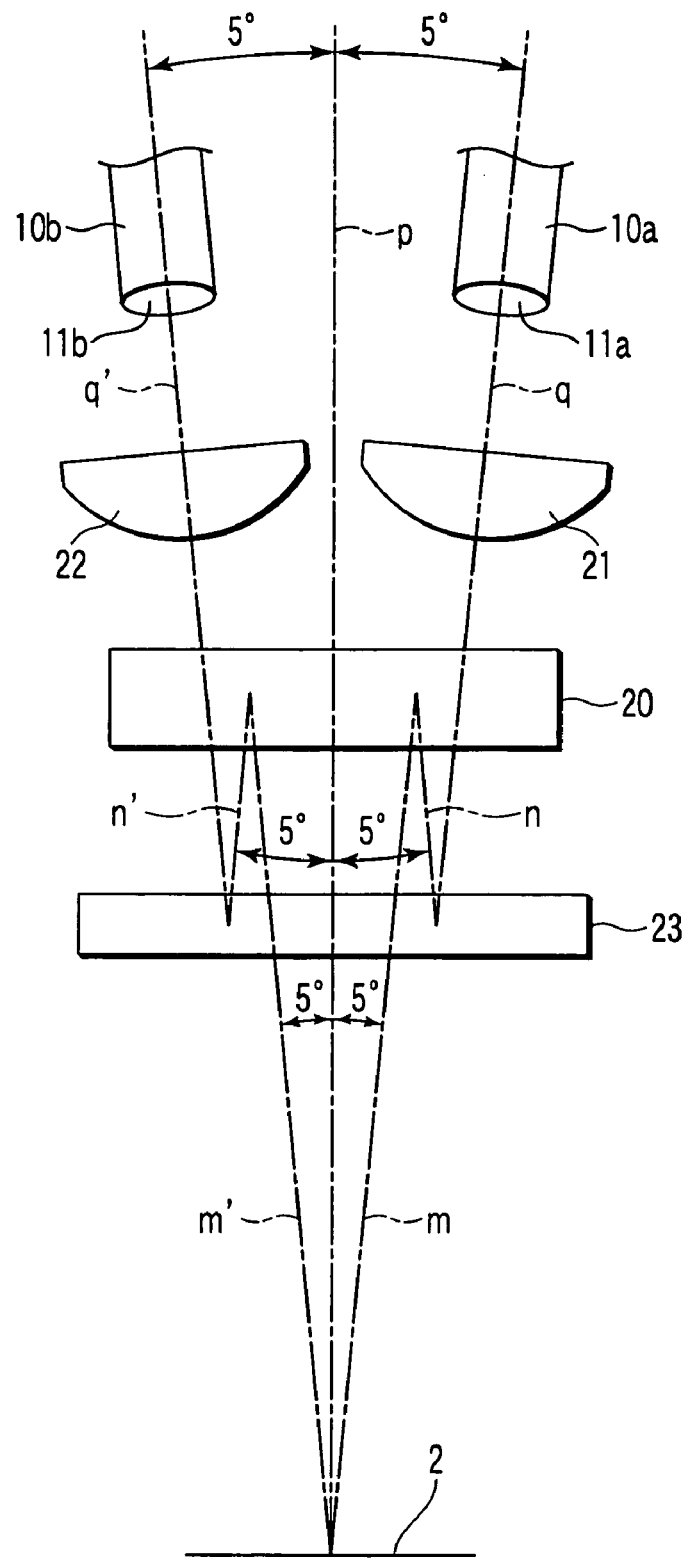
FIG. 4 is a side view of the optics of the same microscope.

FIG. 2 shows the optics of Greenough stereomicroscope. FIG. 2 is a bird's eye view of the optics of the same microscope. FIG. 3 is a front view of the optics of the same microscope. FIG. 4 is a side view of the optics of the same microscope. Greenough stereomicroscope has a pair of observation optical axis m and m' in the left and right sides. The observation optical axes m and m' are aligned on the surface of a sample 2 with an inward angle θ of 10°, for example. The inward angle θ is generally 10–12°.

A semi-transparent mirror 20 such as a half mirror or prism is provided on the observation optical axes m and m', respectively. The semi-transparent mirror 20 reflects each illumination light from a mirror 23 described later downward on the observation optical axes m and m', and transmits the light from the sample 2 upward on the observation optical axes m and m'.

The illumination unite has a pair of illumination optical axes q and q'. The illumination optical axes have an inward angle θ of 10°, for example. The illumination optical axes q and q' are aligned on the surface of the sample 2 when extended. The illumination optical axes q and q' are inclined a predetermined angle, 25° for example, against the observation optical axes m and m', of the Greenough stereomicroscope as shown in FIG. 3. The surface of the sample 2 is located on the extension line of the illumination optical axes q and q'. Namely, the observation optical axes m, m' of the Greenough stereomicroscope and illumination optical axes q, q' are crossed at the same position on the surface of the sample 2.

Light exits 11a and 11b of the illumination optical fibers 10a and 10b are provided on the illumination optical axes q and q', respectively. The light exits 11a and 11b function as a fiber light source to emit illumination light.

Condenser lenses 21 and 22 are provided on the illumination optical axes q and q', respectively. The condenser lenses 21 and 22 condense the illumination light emitted from the illumination optical fibers 10a and 10b.

A mirror 23 is provided on the illumination optical axes q and q', respectively. The mirror 23 reflects the illumination light condensed by the condenser lenses 21 and 22 obliquely upward toward the semi-transparent mirror 20. The illumination light reflected by the mirror 23 travels on a pair of illumination optical axes n and n'. The illumination optical axes n/n' and observation optical axes m/m' are crossed on the semi-transparent mirror 20.

The angle of inclination of the semi-transparent mirror 20 to the observation optical axes m/m' and the angle of inclination of the mirror 23 to the illumination optical axes q/q' are set depending on the locations of the observation optical axes m/m' on the semi-transparent mirror 20 and locations of the illumination optical axes q/q' on the mirror 23, respectively. Namely, the illumination optical axes n and n' of the illumination light reflected by the mirror 23 are crossed with the observation optical axes m and m' on the surface of the semi-transparent mirror 20. The illumination optical axes n and n' of the illumination light reflected by the semi-transparent mirror 20 are aligned with the observation optical axes m and m'. The angle of inclination of the semi-transparent mirror 20 to the observation optical axes m/m' and the angle of inclination of the mirror 23 to the illumination optical axes q/q' are set as described above.

The semi-transparent mirror 20, condenser lenses 21/22 and mirror 23 are provided in the illumination switching frame 9. The illumination optical fibers 10a and 10b are fixed to the illumination switching frame 9 in the direction along the illumination optical axes q and q'. The illumination optical fibers 10a and 10b are connected to the light sources L1 and L2, respectively, from the rear side B of Greenough stereomicroscope.

Next, explanation will be given on the operation of the Greenough stereomicroscope configured as described above.

Illumination light is emitted from the light exits 11a and 11b of the illumination optical fibers 10a and 10b. The illumination light is condensed by the condenser lenses 21/22, traveled on the illumination optical axes q/q', and reflected by the mirror 23. The illumination light reflected by the mirror 23 is traveled on the illumination optical axes n/n', and reflected downward by the semi-transparent mirror 20. The illumination light reflected by the semi-transparent mirror 20 travels downward on the observation optical axes mm', and irradiates the sample 2. This performs coaxial vertical illumination to the sample 2.

The observation light from the sample 2 is traveled upward on the two observation optical axes m and m', transmitted through the semi-transparent mirror 20, and guided to the objective 7 of the stereomicroscope. This provides an observation image of the sample 2 clear to the depths without a shadow. When observing the sample 2 with a high reflectivity, it is possible to obtain an observation image without insufficient light intensity in the incident light to the observation optics.

In the illumination unit configured as described above, the illumination optical fibers 10a and 10b are provided in the illumination switching frame 9 for episcopic illumination to the sample 2. The mirror 23 and semi-transparent mirror 20 are provided in the illumination switching frame 9 for coaxial vertical illumination to the sample 2. The illumination switching frame 9 provided at the end of the objective 7 providing the Greenough stereomicroscope, and can be made compact. The illumination optical fibers 10a and 10b are not provided on the rear side B of the Greenough stereomicroscope from the illumination switching frame 9, and the space on the rear side of the Greenough stereomicroscope can be used effectively. The illumination optical fibers 10a and 10b does not interrupt observation of the sample 2. A light source like a lamp is not provided in the illumination switching frame 9, and the illumination optical fiber 10a and 10b are used to lead illumination light into the illumination switching frame. This also makes the optical system compact.

The mirror 23 can be replaced by a half mirror, for example. Use of a half mirror enables coaxial vertical illumination and episcopic illumination at the same time. Coaxial vertical illumination makes it possible to observe the depths of the sample 2, for example. Episcopic illumination permits observation of the edges on the sample 2. Therefore, by using the coaxial vertical illumination and episcopic illumination at the same time, the depths and edges of the sample 2 can be observed at the same time.

Next, explanation will be given on an illumination unit used in Greenough stereomicroscope.

Figure 5:
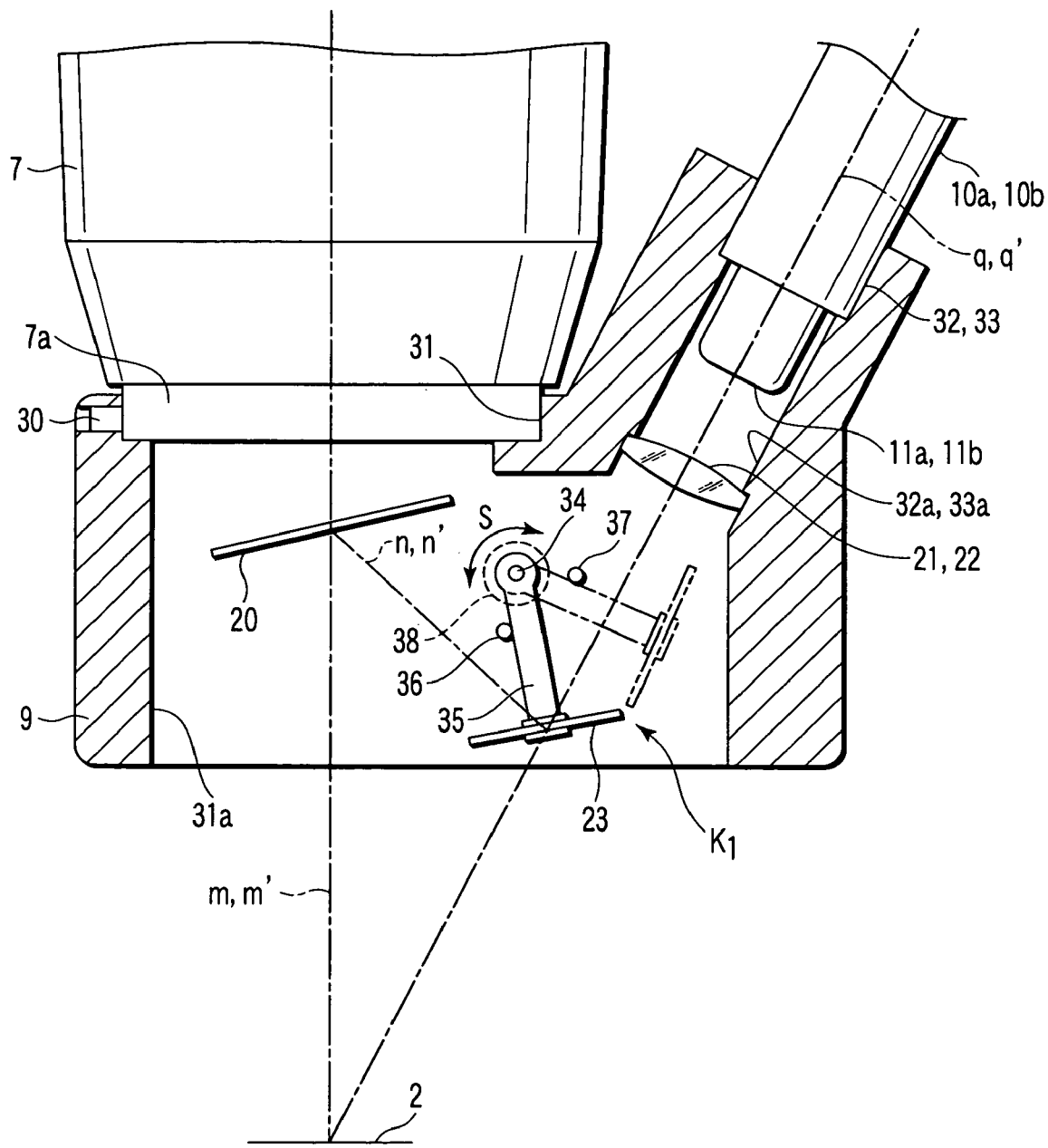
FIG. 5 is a first embodiment of an illumination unit of a stereomicroscope according to the present invention, applied to Greenough stereomicroscope.

FIG. 5 shows the configuration of an illumination unit of a Greenough stereomicroscope. The illumination switching frame 9 is provided with a stereomicroscope mounting frame 31. The stereomicroscope mounting frame 31 is opened circular, for example. The illumination switching frame 9 engages with the end 7a of the objective 7 in stereomicroscope mounting frame 31, fixed to the end 7a of the objective 7 with a clamp screw 30 or the like, and is fixed to the end 7a of the objective 7. The lower part of the stereomicroscope mounting frame 31 is formed as an opening 31a to pass the observation optical axes m/m' and illumination optical axes q/q'.

In the rear upper part of the illumination switching frame 9, fiber fixing parts 32 and 33 are projected. The fiber fixing parts 32 and 33 are provided with light lead-in paths 32a and 33a. The light lead-in paths 32a and 33a are aligned on the illumination optical axes q and q'. The illumination optical fibers 10a and 10b are fixed to the light lead-in paths 32a and 33a, respectively. The illumination optical fibers 10a and 10b are fixed with a screw or a spring in the light lead-in paths 32a and 33a. In the light lead-in paths 32a and 33a, condenser lenses 21 and 22 are provided, respectively.

Figure 6:
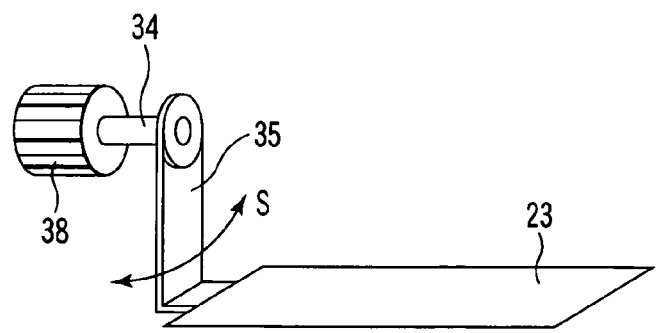
FIG. 6 is an external view of a rotary plate and a folding mirror in the same unit.

The illumination switching frame 9 contains a first rotary mechanism K1. The structure of the first rotary mechanism K1 will be explained. On the inside wall of the illumination switching frame 9, a first axis 34 is provided rotatable. The first axis 34 is connected with one end of a first rotary plate 35. The first rotary plate 35 is rotatable in the arrow S direction centering around the first axis 34. The mirror 23 shown in FIG. 6 is provided at the other end of the first rotary plate 35.

On the inside wall of the illumination switching frame 9, bosses 36 and 37 are provided as first control members. The bosses 36 and 37 are provided on the rotation track of the first rotary plate 35, and control the rotation range of the first rotary plate 35 by contacting with the first rotary plate 35. The bosses 36 and 37 can be provided at any location along the edge of the first rotary plate 35.

A knob 38 is fixed to the first axis 34. The knob 38 is projected to the outside of the illumination switching frame 9 (on the rear side of paper). The knob 38 is fixed to the first axis 34 through a flush-head spring or the like, for example, to make rotation of the first rotary plate 35 heavy. When the knob 38 is rotated in the arrow S direction, the first rotary plate 35 and mirror 23 are rotated.

Next, explanation will be given on the operation of the unit configured as described above.

Coaxial vertical illumination and episcopic illumination are switched by rotating the knob 38 manually in the arrow S direction. When the knob 38 is rotated, the first rotary plate 35 is rotated around the first axis 34. The mirror 23 is rotated together with the rotation of the first rotary plate 35.

In the state that the first rotary plate 35 comes in contact with one bosses 36 (the mirror is indicated by a solid line), the mirror 23 is located at the point where the illumination optical axes n/n' and illumination optical axes q/q' are crossed. The illumination optical fibers 10a and 10b are fixed to the fiber fixing parts 32 and 33, respectively. Illumination light is emitted from the light exits 11a and 11b of the illumination optical fibers 10a and 10b.

The illumination light is condensed by the condenser lenses 21 and 22, reflected by the mirror 23, and deflected by the semi-transparent mirror 20. The illumination light is illuminated to the sample 2 coaxially with the observation optical axes m and m' of the stereomicroscope. This enables observation of the sample 2 with coaxial vertical illumination.

Contrarily, in the state that the first rotary plate 35 is brought be make contact with the other bosses 37 by the rotation of the knob 38 (the mirror 23 is indicated by a broken line), the mirror 23 is located out of the illumination optical axes q and q'.

In this state, illumination light is emitted from the light exits 11a and 11b of the illumination optical fibers 10a and 10b. The illumination light travels on the illumination optical axes q and q', and irradiates the sample 2 from the upper oblique direction. This enables observation of the sample 2 with episcopic illumination. In this time, even if the illumination optical axes q and q' are shifted from the center of the sample 2, the performance of episcopic illumination is satisfied if the shift is within the range that the sample 2 can be sufficiently illuminated.

When the positions of the light exits 11a and 11b of the illumination optical fibers 10a and 10b, the clearance between the light exits 11a and 11b and the condenser lenses 21 and 22 is changed, the irradiation range of episcopic illumination to the sample 2 is changed.

In the above-mentioned first embodiment, the first rotary mechanism K1 which rotates the mirror 23 to insert in and remove from the illumination optical axes q and q' is provided in the illumination switching frame 9 fixed to the end 7a of the objective 7. This makes it possible to switch coaxial vertical illumination and episcopic illumination simply by rotating the knob 38. Even if the mirror 23 is rotated within the illumination switching frame 9, it does not interrupt the observation optical axes m/m' and illumination optical axes q/q'. The illumination optical fibers 10a and 10b are common to coaxial vertical illumination and episcopic illumination, and manufactured the Greenough stereomicroscope at a low cost simply by inserting and removing the mirror 23.

Since the semi-transparent mirror 20, condenser lenses 21/22 and mirror 23 are provided in the illumination switching frame 9, and the illumination light is led in the illumination switching frame 9 by angle for episcopic illumination, and through the illumination optical fibers 10a and 10b, the mechanism itself to switch coaxial vertical illumination and episcopic illumination can be made compact.

It is also possible to select coaxial vertical illumination and episcopic illumination to the sample 2. This is effective when observing only the edges on the sample 2 in a clear image with the episcopic illumination, for example. By replacing the mirror 23 by a half mirror, coaxial vertical illumination and episcopic illumination to the sample 2 can be made simultaneously.

Next, explanation will be given on a second embodiment of the present invention. The same reference numerals are given to the same parts as those in FIG. 5, and detailed explanation will be omitted.

Figure 7:
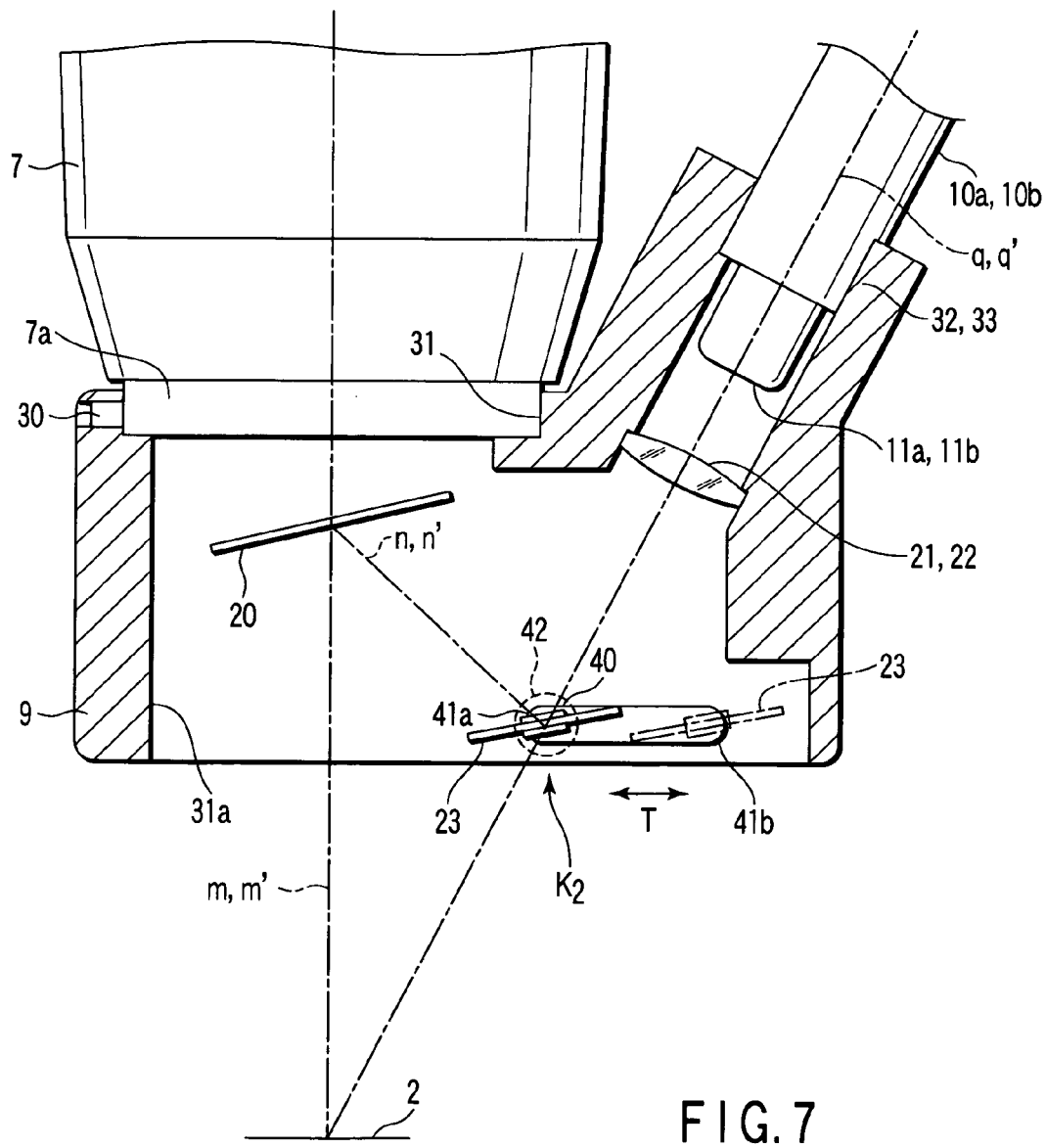
FIG. 7 shows a configuration of a second embodiment of an illumination unit of a stereomicroscope according to the present invention, applied to Greenough stereomicroscope.

FIG. 7 shows the configuration of an illumination unit of Greenough stereomicroscope. A sliding mechanism K2 is provided in the illumination switching frame 9. The configuration of the sliding mechanism K2 will be explained. The mirror 23 is provided on the slide axis 40. The slide axis 40 is fit in the slide hole 41 and fixed slidable.

The slide hole 41 is provided on the inside wall of the illumination switching frame 9. The slide hole 41 is formed rectangular on the FIG. 7, and provided with wall parts 41a and 41b at both ends. The slide hole 41 slides the slide axis 40 into the corresponding hole. The wall parts 41a and 41b of the slide hole 41 control the sliding range of the slide axis 40 by contacting the slide axis 40.

A knob 42 is fixed to the slide axis 40. The knob 42 is projected to the outside of the illumination switching frame 9. By moving the knob 42 manually in the arrow T direction, the slide axis 40 and mirror 23 are moved in the arrow T direction.

Next, explanation will be given on the operation of the unit configured as described above.

Coaxial vertical illumination and episcopic illumination are switched by sliding the knob 42 manually in the arrow T direction. When the knob 42 is slid, the slide axis 40 slides into the slide hole 41.

In the state that the slide axis 40 comes in contact with one wall part 41a of the slide hole 41 (the mirror 23 is indicated by a solid line), the mirror 23 is located at the point where the illumination optical axes n/n' and illumination optical axes q/q' are crossed.

Illumination light is emitted from the light exits 11a and 11b of the illumination optical fibers 10a and 10b. The illumination light is condensed by the condenser lenses 21 and 22, reflected by the mirror 23, and deflected by the semi-transparent mirror 20. The illumination light is illuminated to the sample 2 coaxially with the observation optical axes m and m' of the stereomicroscope. This enables observation of the sample 2 with coaxial vertical illumination.

Contrarily, in the state that the slide axis 40 comes in contact with the other wall part 41b of the slide hole 41 (the mirror 23 is indicated by a broken line), the mirror 23 is located out of the illumination optical axes q and q'.

In this state, the illumination light is emitted from the light exits 11a and 11b of the illumination optical fibers 10a and 10b. The illumination light travels on the illumination optical axes q and q', and irradiates the sample 2 directly from the oblique upper direction. This enables observation of the sample 2 with episcopic illumination.

In the above-mentioned second embodiment, the sliding mechanism K2 is provided to slide the mirror 23, and the same effects as the first embodiment can be obtained.

Next, explanation will be given on a third embodiment of the present invention. The same reference numerals are given to the same parts as those in FIG. 5, and detailed explanation will be omitted.

Figure 8:
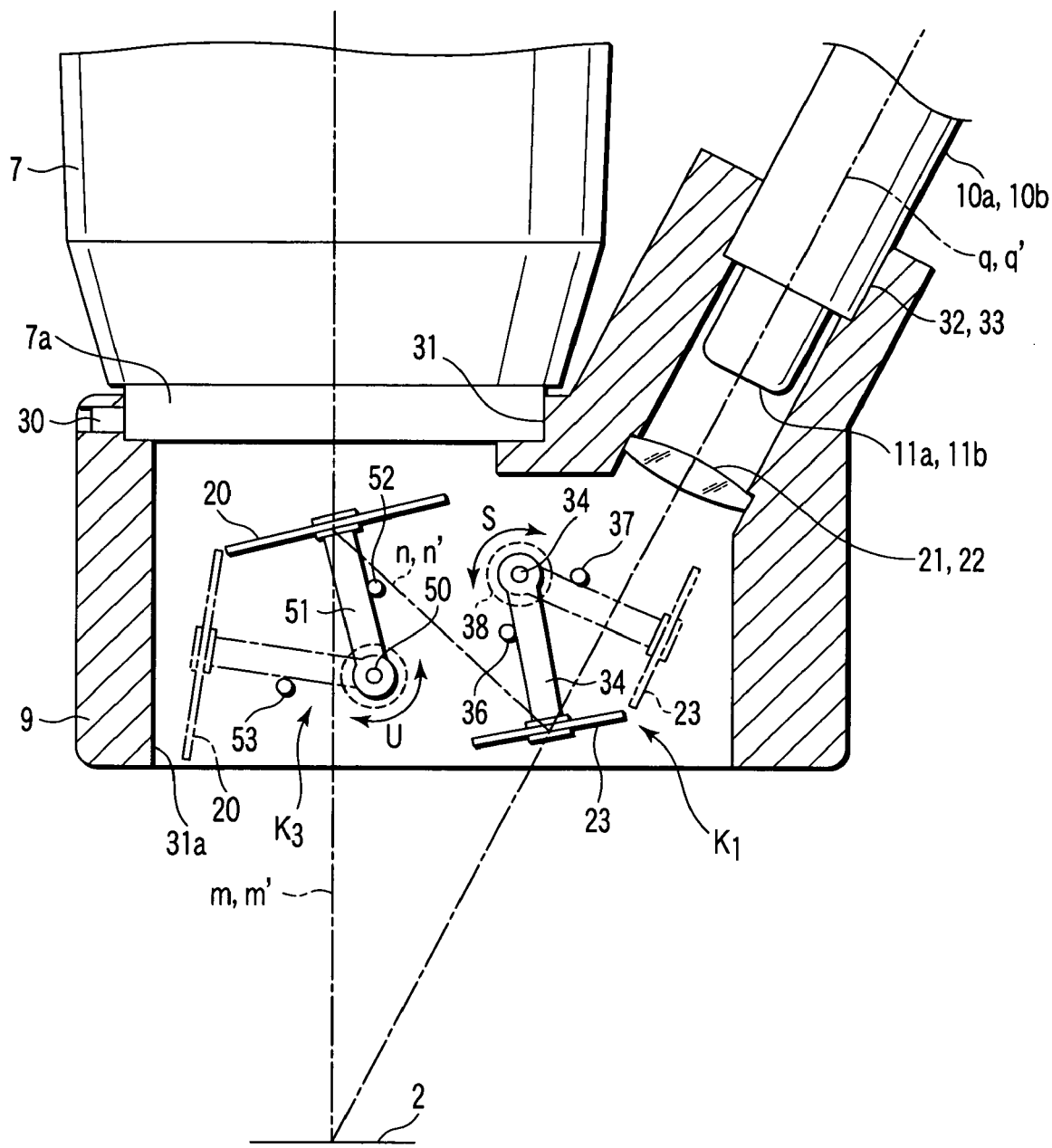
FIG. 8 shows a configuration of a third embodiment of an illumination unit of a stereomicroscope according to the present invention, applied to Greenough stereomicroscope.

FIG. 8 shows the configuration of an illumination unit of Greenough stereomicroscope. A second rotary mechanism K3 is provided in the illumination switching frame 9. The configuration of the second rotary mechanism K3 will be explained. A second axis 50 is provided rotatable on the inside wall of the illumination switching frame 9. One end of a second rotary plate 51 is fixed to the second axis 50. The second rotary plate 51 is provided rotatable in the arrow U direction around the second axis 50. The semi-transparent mirror 20 is proved at the other end of the second rotary plate 51.

Bosses 52 and 53 are provided as two second control members on the inside wall of the illumination switching frame 9. The bosses 52 and 53 control the rotation range of the second rotary plate 51 by contacting the second rotary plate 51. The bosses 52 and 53 can be provided at any location along the edge of the second rotary plate 51.

The second axis 50 is projected to the outside of the illumination switching frame 9. A knob 54 is fixed to the second axis 50. By rotating the knob 54 manually in the arrow U direction, the second rotary plate 51 and semi-transparent mirror 20 are rotated accordingly in the arrow U direction.

Next, explanation will be given on the operation of the unit configured as described above.

Coaxial vertical illumination and episcopic illumination are switched by rotating one knob 38 manually in the arrow S direction and the other knob 54 in the arrow U direction. The first rotary plate 35 rotates around the first axis 34 and comes in contact with the bosses 36 or 37 by the rotation of the knob 38. In the state that the first rotary plate 35 contacts the bosses 36 (the mirror 23 is indicated by a solid line), the mirror 23 is located at the point where the illumination optical axes n/n' and illumination optical axes q/q' are crossed.

In the same way, the second rotary plate 51 rotates around the second axis 50 and comes in contact with the bosses 52 or 53 by the rotation of the knob 54. In the state that the second rotary plate 51 contacts the bosses 52 (the semi-transparent mirror 20 is indicated by a solid line), the semitransparent mirror 20 is located at the point where the observation optical axes m/m' and illumination optical axes n/n' are crossed.

Illumination light is emitted from the light exits 11a and 11b of the illumination optical fibers 10a and 10b. The illumination light is condensed by the condenser lenses 21 and 22, reflected by the mirror 23, and deflected by the semi-transparent mirror 20. The illumination light is illuminated to the sample 2 coaxially with the observation axes m and m' of the stereomicroscope. This enables observation of the sample 2 with coaxial vertical illumination.

In the state that the first rotary plate is brought into contact with the bosses 37 by the rotation of the knob 38 (the mirror 23 is indicated by a broken line), the folding mirror is located out of the illumination optical axes q and q'. Contrarily, in the state that the second rotary plate is brought into contact with the bosses 53 by the rotation of the knob 54 (the semi-transparent mirror is indicated by a broken line), the semi-transparent mirror 20 is located out of the observation optical axes m and m'.

In this state, illumination light is emitted from the light exits 11a and 11b of the illumination optical fibers 10a and 10b. The illumination light travels on the illumination optical axes q and q', and irradiates the sample 2 directly from the oblique upper direction. This enables observation of the sample 2 with episcopic illumination.

In the above-mentioned third embodiment, the semi-transparent mirror 20 is provided in the second rotary mechanism K3 that is inserted into and removed from the observation optical axes m and m', and the same effects as the first embodiment can be obtained. In addition, the semi-transparent mirror 20 can be removed from the observation axes m and m' when using episcopic illumination, increasing the resolution and brightness of the sample 2 with episcopic illumination.

Next, explanation will be given on a fourth embodiment of the present invention. The same reference numerals are given to the same parts in FIG. 5, and detailed explanation will be omitted.

Figure 9:
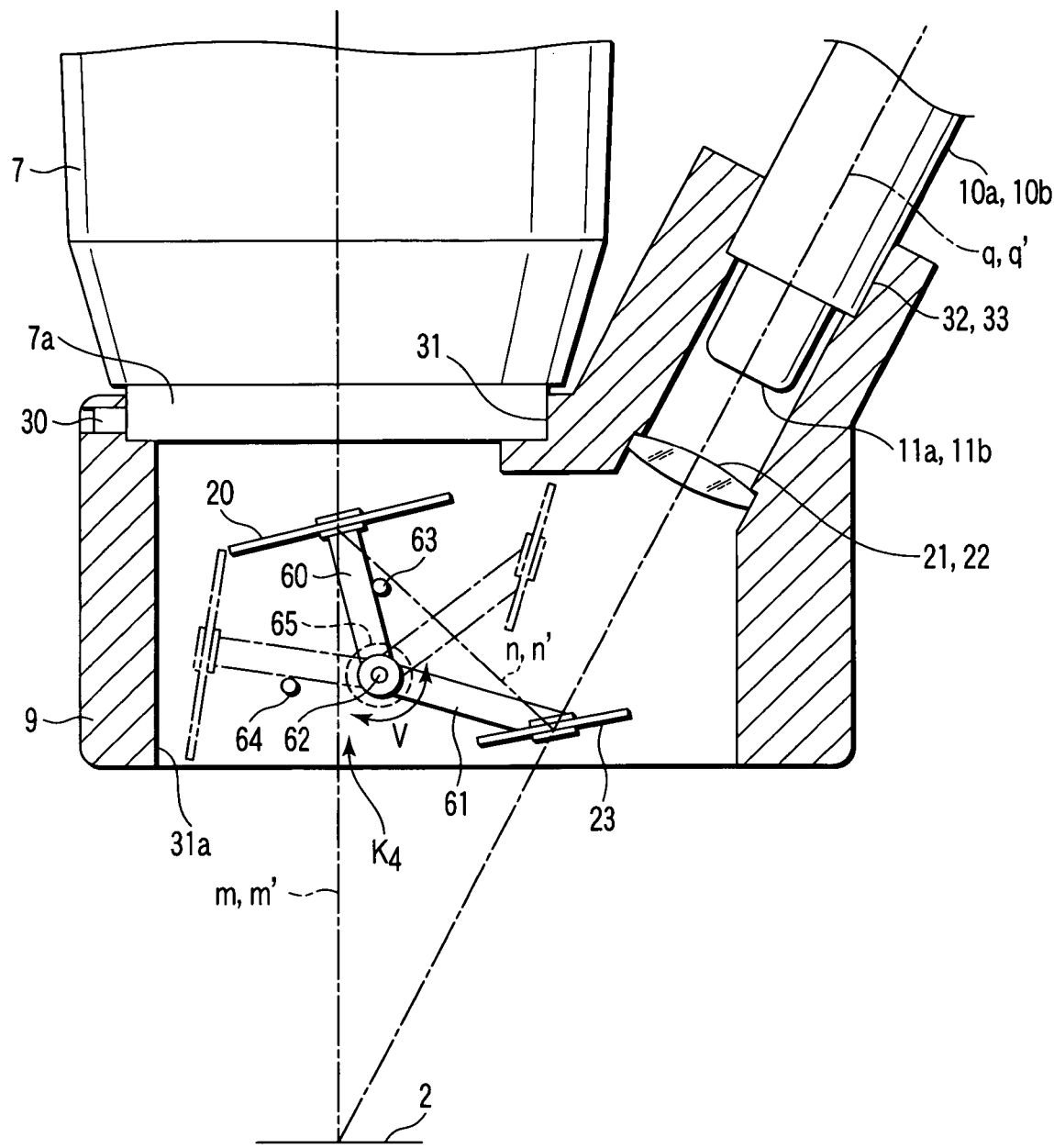
FIG. 9 shows a configuration of a fourth embodiment of an illumination unit of a stereomicroscope according to the present invention, applied to Greenough stereomicroscope.

FIG. 9 shows the configuration of an illumination unit of Greenough stereomicroscope. An interlocking mechanism K4 is provided in the illumination switching fame 9. The configuration of the interlocking mechanism K4 will be explained. The semi-transparent mirror 20 is fixed to a rotary plate 60 of the observation side. The mirror 23 is fixed to a rotary plate 61 of the illumination side.

The rotary plate 60 of the observation side and rotary plate 61 of the illumination side are provided as one body with a certain angle taken to each other. The rotary plate 60 of the observation side and rotary plate 61 of the illumination side are provided rotatable in the arrow V direction around a third axis 62. The third axis 62 is provided rotatable on the inside wall of the illumination switching frame 9.

On the inside wall of the illumination switching frame 9, bosses 63 and 64 are provided as third control members. The bosses 63 and 64 control the rotation range of the rotary plate 60 of the observation side and rotary plate 61 of the illumination side by contacting the rotary plate 60 of the observation side. The bosses 63 and 64 can be provided at any location along the edge of the rotary plate 60 of the observation side. It is also permitted that the bosses 63 and 64 control the rotation range of the rotary plate 60 of the observation side and rotary plate 61 of the illumination side by contacting the rotary plate 61 of the illumination side.

A knob 65 is fixed to the third axis 62, projecting to the outside of the illumination switching frame 9. When the knob 65 is rotated in the arrow V direction, the rotary plate 60 of the observation side and rotary plate 61 of the illumination side are rotated as one body, and the mirror 23 and semi-transparent mirror 20 are rotated accordingly.

Next, explanation will be given on the operation of the unit configured as described above.

Coaxial vertical illumination and episcopic illumination are switched by rotating one knob 65 manually. By the rotation of the knob 65, the rotary plate 60 of the observation side and rotary plate 61 of the observation side are rotated as one body in the arrow V direction around the third axis 62.

In the state that the rotary plate 60 of the observation side is brought into contact with the bosses 63 by the rotation of the rotary plate 60 of the observation side and rotary plate 61 of the illumination side (the mirror 23 and semi-transparent mirror 20 are indicated by a solid line), the mirror 23 is located at the point where the illumination optical axes n/n' and illumination optical axes q/q' are crossed, and the semi-transparent mirror 20 is located at the point where the observation optical axes m/m' and illumination optical axes n/n' are crossed.

Illumination light is emitted from the light exits 11a and 11b of the illumination optical fibers 10a and 10b. The illumination light are condensed by the condenser lenses 21 and 22, reflected by the mirror 23, and deflected by the semi-transparent mirror 20. The illumination light is illuminated to the sample 2 coaxially with the observation axes m and m' of the stereomicroscope. This enables observation of the sample 2 with coaxial vertical illumination.

In the state that the rotary plate 60 of the observation side is brought into contact with the bosses 64 by the manual rotation of the knob 65 (the mirror 23 and semi-transparent mirror 20 are indicated by a broken line), the folding mirror is located out of the illumination optical axes q and q', and the semi-transparent mirror 20 is also located out of the observation optical axes m and m'.

In this state, illumination light is emitted from the light exits 11a and 11b of the illumination optical fibers 10a and 10b. The illumination light travels on the illumination optical axes q and q', and irradiates the sample 2 directly from the oblique upper direction. This enables observation of the sample 2 with episcopic illumination.

In the above-mentioned fourth embodiment, the interlocking mechanism K4 is provided to rotate the mirror 23 and semi-transparent mirror 20 as one body. Coaxial vertical illumination and episcopic illumination can be switched simply by rotating the knob 65 by hand. The semi-transparent mirror 20 is displaced from the observation optical axes m and m' for the observation with episcopic illumination, and the resolution and brightness of the observation image of the sample 2 can be increased in the observation with episcopic illumination. Further, these effects in the embodiment can be achieved by one action of simply rotating one knob 65.

The present invention is not limited to the above-mentioned embodiments, and various modifications are permitted. For example, for the mechanisms to insert and remove the mirror 23 and semi-transparent mirror onto/from the illumination optical axes q/q' and observation optical axes m/m', a track like a rail may be provided to move the mirror 23 and semi-transparent mirror 20 on this rail.

The first rotary mechanism K1, sliding mechanism K2, second rotary mechanism K3 and interlocking mechanism K4 are manually operated, but they may be operated automatically. For example, in the first rotary mechanism K1, a motor axis is connected to the first axis 34. A small motor is rotated forward or backward by a motor controller. In the first rotary mechanism K1 configured as above, when the small motor is rotated forward or backward, the first rotary plate 35 comes in contact with the bosses 36 or 37. In this time, the load of the small motor is increased. The motor controller detects the increased load of the small motor, and stops the motor. By this action, the mirror 23 is inserted onto or displaced from the illumination optical axes q and q'.

In the second rotary mechanism K2, a motor axis is connected to the second axis 50. A small motor is rotated forward or backward by a motor controller. In the second rotary mechanism K2 configured as above, when the small motor rotates forward or backward, the second rotary plate 51 comes in contact with the bosses 52 or 53. In this time, the load of the small motor is increased. The motor controller detects the increased load of the small motor, and stops the motor. By this action, the semi-transparent mirror 20 is inserted onto or displaced from the observation optical axes m and m'.

In the interlocking mechanism K4, a motor axis is connected to the third axis 62. A small motor is rotated forward or backward by the motor controller. In the interlocking mechanism K4 configured as above, when the small motor rotates forward or backward, the rotary plate 60 of the observation side comes in contact with the bosses 63 or 64. In this time, the load of the small motor is increased. The motor controller detects the increased load of the small motor, and stops the motor. By this action, the mirror 23 is inserted onto the illumination optical axes q and q', and the semi-transparent mirror 20 is inserted onto observation optical axes m and m', or the mirror 23 is displaced from the illumination optical axes q and q', and the semi-transparent mirror 20 is displaced from the observation optical axes m and m'.

The fiber fixing parts 32 and 33 fixed to the illumination switching frame 9 may be provided obliquely according to the angle of inclination when the angle of the illumination optical axes q and q' to the observation optical axes m and m' is changed. The fiber fixing parts 32 and 33 may also be provided on the side or rear of the illumination switching frame 9. A mirror is provided between the light exits 11a/11b of the illumination optical fibers 10a/10b and the mirror 23, and the illumination light emitted from the illumination optical fibers 10a and 10b is reflected by the mirror, and guided to the mirror 23.

Also, in the second to fourth embodiments, the mirror 23 is replaceable by a half mirror, for example. If a half mirror is used, coaxial vertical illumination and episcopic illumination can be made simultaneously, enabling simultaneous observation of the depths and edges of the sample 2, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination unit of a stereomicroscope comprising:
an objective;
a pair of observation optical axes aligned with an inward angle to each other which pass through the objective and cross on a surface of a sample;
a pair of illumination light sources which outputs illumination light;
a pair of illumination optical axes which is aligned with the same inward angle as the observation optical axes to each other, and on which the illumination light outputted from the illumination light sources travels;
a pair of illumination lenses which condenses the illumination light traveled on the illumination optical axes;
a mirror which is provided on the illumination optical axes, and reflects the illumination light condensed by the illumination lenses on one plane; and
a half mirror which is provided on the observation optical axes, and reflects the illumination light reflected by the mirror coaxially reflected to the observation optical axes, and transmits the light from the sample to the objective.

2. The illumination unit of a stereomicroscope according to claim 1, further comprising an enclosure which is fixable to and removable from the end of the objective, the enclosure containing the mirror and the half mirror.

3. The illumination unit of a stereomicroscope according to claim 2, wherein the enclosure further comprises the pair of illumination lenses.

4. The illumination unit of a stereomicroscope according to claim 2, wherein the enclosure has a light source fixing part for holding an exit end of the illumination light source, the light source fixing part being arranged so that the illumination optical axes is provided obliquely with respect to the observation axes.

5. The illumination unit of a stereomicroscope according to claim 4, wherein the light source fixing part is provided to align the illumination optical axes so as to have the same inward angle as that of the pair of observation optical axes.

6. The illumination unit of a stereomicroscope according to claim 4, wherein the illumination light source comprises a pair of optical fibers having light exits for emitting the illumination light, and the light source fixing part holds the light exits of the optical fibers.

7. The illumination unit of a stereomicroscope according to claim 1, wherein the illumination optical axes are aligned with an angle against the observation optical axes.

8. The illumination unit of a stereomicroscope according to claim 1, wherein the illumination light source has light exits of a pair of optical fibers to emit the illumination light.

9. The illumination unit of a stereomicroscope according to claim 1, wherein the mirror includes a half mirror.

10. The illumination unit of a stereomicroscope according to claim 1, further comprising a first rotary mechanism provided with the mirror, the first rotary mechanism rotating the mirror to insert and remove the mirror onto/from the illumination optical axes.

11. The illumination unit of a stereomicroscope according to claim 10, wherein the first rotary mechanism has a rotatable first axis, and a first rotary plate whose one end is connected to the first axis and the other end is provided with the mirror.

12. The illumination unit of a stereomicroscope according to claim 11, wherein the first rotary mechanism has two first control members to control the rotation range of the rotary plate.

13. The illumination unit of a stereomicroscope according to claim 11, wherein the first axis is provided with a manual knob or automobile motor axis to insert and remove the mirror onto/from the illumination optical axes.

14. The illumination unit of a stereomicroscope according to claim 1, further comprising a sliding mechanism provided with the mirror, the sliding mechanism sliding the mirror and insert to remove the mirror onto/from the illumination optical axes.

15. The illumination unit of a stereomicroscope according to claim 14, wherein the sliding mechanism has a slide axis provided in the mirror, and a slide hole to fit the slide axis slidable.

16. The illumination unit of a stereomicroscope according to claim 15, wherein the slide hole has a wall at the ends to control the sliding range of the slide axis.

17. The illumination unit of a stereomicroscope according to claim 15, wherein the slide axis is provided with a manual knob which inserts and removes the mirror into/from the illumination optical axes.

18. The illumination unit of a stereomicroscope according to claim 15, wherein the slide axis is provided in an automatic sliding mechanism which slides the slide axis in the slide hole; and
the automatic sliding mechanism has a motor having an axis, and a motion converting mechanism which is provided on the axis of the motor and converts the rotational movement of the axis into linear movement.

19. The illumination unit of a stereomicroscope according to claim 1, further comprising a second rotary mechanism provided with the half mirror, the second rotary mechanism rotating the half mirror to insert and remove the mirror onto/from the observation optical axes.

20. The illumination unit of a stereomicroscope according to claim 19, wherein the second rotary mechanism has a second rotatable axis, and a second rotary plate whose one end is connected to the second axis and the other end is provided with the half mirror.

21. The illumination unit of a stereomicroscope according to claim 20, wherein the second rotary mechanism has two second control members which controls the rotation range of the rotary plate.

22. The illumination unit of a stereomicroscope according to claim 20, wherein the second axis is provided with a manual knob or automobile motor axis to insert and remove the half mirror onto/from the illumination optical axes.

23. The illumination unit of a stereomicroscope according to claim 1, further comprising a first rotary mechanism which rotates the mirror to insert and remove the mirror onto/from the illumination axes, the first rotary mechanism having a first rotatable axis and a first rotary plate whose one end is connected to the first axis and the other end is provided with the mirror; and
a second rotary mechanism which rotates the half mirror to insert and remove the mirror onto/from the observation axes, the second rotary mechanism having a second rotatable axis and a second rotary plate whose one end is connected to the second axis and the other end is provided with the half mirror.

24. The illumination unit of a stereomicroscope according to claim 23, wherein the first rotary mechanism has two first control members which controls the rotation range of the rotary plate; and the second rotary mechanism has two second control members which controls the rotation range of the rotary plate.

25. The illumination unit of a stereomicroscope according to claim 23, wherein the first axis is provided with a manual knob or automobile motor axis to insert and remove the mirror onto/from the illumination optical axes; and the second axis is provided with a manual knob or automobile motor axis to insert and remove the half mirror onto/from the observation optical axes.

26. The illumination unit of a stereomicroscope according to claim 1, further comprising an interlocking mechanism which has the mirror and half mirror, the interlocking mechanism inserting and removing the mirror onto/from the illumination optical axes, and inserts and removes the half mirror onto/from the observation axes.

27. The illumination unit of a stereomicroscope according to claim 26, wherein the interlocking mechanism has a third rotatable axis, a rotary plate of the observation side whose one end is connected to the axis and the other end is provided with the mirror, and a rotary plate of the illumination side whose one end is connected to the axis and the other end is provided with the mirror; and the rotary plate of the observation side and rotary plate of the illumination side are provided as one body.

28. The illumination unit of a stereomicroscope according to claim 27, wherein the interlocking mechanism has two second control members which control the rotation range of the rotary plate of the observation side and rotary plate of the illumination side.

29. The illumination unit of a stereomicroscope according to claim 28, wherein the second control members come in contact with the rotary plate of the observation side or the rotary plate of the illumination side.

30. The illumination unit of a stereomicroscope according to claim 27, wherein the third axis is provided with a manual knob or automobile motor axis which inserts and removes the mirror onto/from the illumination optical axes, and inserts and removes the half mirror onto/from the observation optical axes.

31. The illumination unit of a stereomicroscope according to claim 1, wherein the pair of illumination optical axes is provided with an acute angle against the observation axes on the surface of the sample.

32. The illumination unit of a stereomicroscope according to claim 1, wherein the half mirror is inserted onto and removed from the illumination optical axes, and illumination to the sample is switchable between a coaxial vertical illumination and an episcopic illumination.

33. An illumination unit of a stereomicroscope comprising:

an objective:

a pair of observation optical axes aligned with an inward angle to each other which pass through the objective and cross on a surface of a sample;

a pair of illumination light sources which outputs illumination light;

a pair of illumination optical axes which is provided with an angle against the observation optical axes, and on which the illumination light outputted from the illumination light source travels;

a pair of illumination lenses which condenses the illumination light traveled on the illumination optical axes;

a mirror which is provided on the illumination optical axes, and reflects the illumination light condensed by the illumination lenses on one plane;

a half mirror which is provided on the observation optical axes, and reflects the illumination light reflected by the mirror coaxially reflected to the observation optical axes, and transmits the light from the sample to the objective; and an enclosure which is fixable to and removable from the end of the objective, the enclosure containing the mirror and half mirror.

34. An illumination unit of a stereomicroscope comprising:

a pair of observation optical axes aligned with an inward angle to each other which pass through an objective and cross on a surface of a sample;

the objective provided on the observation optical axes;

a pair of illumination light sources which are aligned with the same inward angle as the observation optical axes to each other;

a pair of illumination optical axes which are aligned with an angle against the observation optical axes, and on which the illumination light outputted from the illuminations light sources travels;

a pair of illumination lenses which condenses the illumination light traveled on the illumination optical axes;

a half mirror which is provided on the observation optical axes, and reflects the illumination light reflected by the mirror coaxially reflected to the observation optical axes, and transmits the light from the sample to the objective; and an enclosure which is fixable to and removable from the end of the objective, the enclosure containing the half mirror.

* * * * *